United States Patent

[11] 3,583,240

[72] Inventor Fritz Ostwald
  Buchschlag, Germany
[21] Appl. No. 758,022
[22] Filed Sept. 6, 1968
[45] Patented June 8, 1971
[73] Assignee Alfred Teves G.m.b.H.
  Frankfurt am Main, Germany
[32] Priority Sept. 26, 1967
[33] Germany
[31] T34890

[54] ACCELEROMETER
  12 Claims, 4 Drawing Figs.

[52] U.S. Cl. .................................................. 73/517,
  188/187
[51] Int. Cl. .................................................. G01p 15/08
[50] Field of Search.......................................... 73/505,
  511, 517, 516, 70.1, 136, 514; 188/181, 187

[56] References Cited
  UNITED STATES PATENTS
1,024,183   4/1912   Clinker........................   73/514

2,427,239   9/1947   Taylor.........................   73/514
2,260,036   10/1941  Kuehni........................   73/136
2,656,175   10/1953  Lee............................   73/511
2,841,387   7/1958   Mortimer......................  188/181
3,227,834   1/1966   Keese..........................   73/514
3,379,288   4/1968   Davis.........................   188/181

Primary Examiner—James J. Gill
Assistant Examiner—Herbert Goldstein
Attorney—Karl F. Ross ABSTRACT: An accelerometer for metering the angular acceleration of a rotating body such as a motor vehicle wheel has a rotatable, axially lengthenable and shortenable member connected on one side to the rotating body and on the other side to a rotatable mass such that a change in acceleration of the body creates a torque in the member causing it to lengthen or shorten. This change in length of the member is transformed into an electrical-analogue output by a strain-gauge device responsive to changes in length of the member.

PATENTED JUN 8 1971

Fritz Ostwald
INVENTOR.

BY

Karl F. Ross
Attorney

ACCELEROMETER

My invention relates to an accelerometer intended for use in metering acceleration, in particular the angular acceleration of a motor vehicle wheel.

The main use of my invention is in the regulation of brake systems. Since braking is most efficiently carried out when the wheel is not blocked thus causing it to skid, that is when almost all the braking friction is generated in the brake rather than between the wheel and the road surface, a device for measuring angular acceleration is useful in a system wherein the brake pressure is regulated to an ideal level for this optimum, nonskid braking.

An accelerometer used in such a system should have several characteristics. Since it is preferably coupled directly to the vehicle wheel, it is usually mounted on the axle or some other vehicle part which does not benefit from the vehicle suspension. Thus it is often exposed to very great shocks and must be extremely rugged.

In addition, it is preferable to make the accelerometer as small as possible so that it can easily fit wherever it is to be mounted, and so that it will suffer as little as possible from the above-mentioned shocks to which it may be subjected.

Furthermore, the accelerometer must not meter these shocks, but must respond only to the angular acceleration.

Generally speaking, conventional system wherein the brake pressure is regulated with the help of an accelerometer used a solenoid-actuated valve in the brake line. Thus a DC amplifier must usually be placed between the accelerometer and the valve to boost the current enough to actuate this valve. This is a disadvantage since the provision of such an amplifier makes for added expense and likelihood of failure.

Thus, it is an object of my invention to provide an accelerometer which has the above-mentioned characteristics and which overcomes the difficulties inherent in the devices described above.

A further object of my invention is to provide an improved accelerometer which is nevertheless inexpensive to produce.

These objects are attained according to the salient features of my invention by an extremely compact and rugged accelerometer which has a cylindrical housing intended to be mounted adjacent a vehicle wheel. Inside this housing is a cylindrical mass which is carried on bearings to rotate freely, but without any appreciable axial movement. A slender input shaft from the wheel, which can extend through the axle thereof, is connected to one side of a rotatable expandable member whose axial length varies in proportion to the torque exerted on its one side by the shaft and on its other side by the mass which is joined to it through a flexible coupling permitting limited relative rotation between the mass and the member. This member bears through an axial thrust bearing on a pressure-responsive sensing means which is here a sleeve filled with strain-gauge wires or strips. The cylindrical mass surrounds most of the other parts.

Due to the extremely compact and solid design of my invention, mounting it directly on a vehicle axle or wheel mount presents no problem since it takes up only a nominal amount of room and can easily withstand the shocks it will be subjected to there.

A main feature of the strain-gauge type of sensor is that, if it is made of a sleeve filled with strain-gauge wires, it can have a high output current thus obviating the need of an amplifier between it and the valve.

The above and other objects, features, and advantages of the present invention are described in greater detail below with reference to the accompanying drawing in which.

Figure 1:
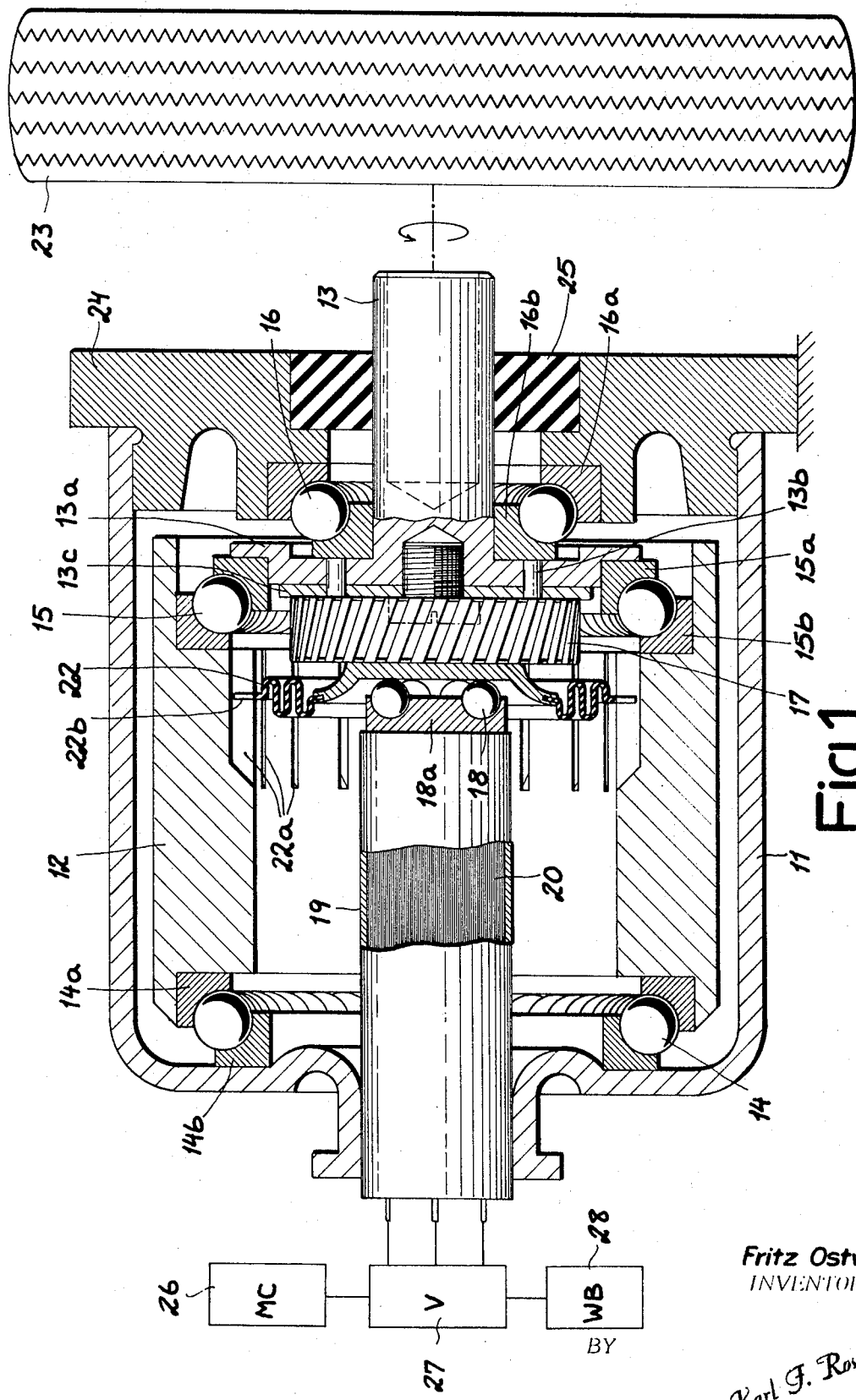
FIG. 1 shows an accelerometer according to my invention, in longitudinal section, installed in a brake-regulation system shown schematically.

FIG. 1 shows my accelerometer connected to a motor-vehicle wheel 23 and to a solenoid-actuated valve 27 in the brake line between a master cylinder 26 and a wheel brake 28.

The accelerometer comprises a housing 11 closed at one end by a plate 24 in which a seal 25 is set. A shaft member 13 connected to the wheel 23 passes through this seal 25 and is rotatable in a roller bearing 16 having one race 16b on the shaft member 13 and the other race 16a resting against the plate 24.

A cylindrical mass 12 is rotatable inside this housing 11 on a bearing 14 with races 14a and 14b and on a bearing 15 whose one race 15b is on the mass 12 and whose other race 15a is on a flange portion 13a of the shaft member 13. All these bearings 14, 15, and 16 are combined axial-radial thrust bearings allowing effectively no axial movement or play of the mass 12 in relation to the housing 11.

The portion 13a carries on expandable member 17 on a washer 13c via pins 13b. On its opposite side, this member 17 is fitted with a membrane 22 having a great many folds and connected at its outer periphery to the mass 12 by means of tiny protuberances 22b engaged in axial slots 22a milled in the mass 12 uniformly along its inner periphery.

The member 17 bears axially through a thrust bearing 18 on a race 18a on a sensor comprising a sleeve 19 surrounding around a thousand strain-gauge wires 20, each one taking about 0.1 percent of the total load. These wires 20 are strain-gauge wires as discussed in *Servomechanism Practice* by Ahrendt and Savant (McGraw-Hill, N.Y., 1960). Because of the large number of these wires and their stiffness, they can accommodate a relatively large current and have a high natural or resonance frequency to restrict perturbation of the output. These wires 20 are prestressed to measure both acceleration and deceleration.

Figure 2:
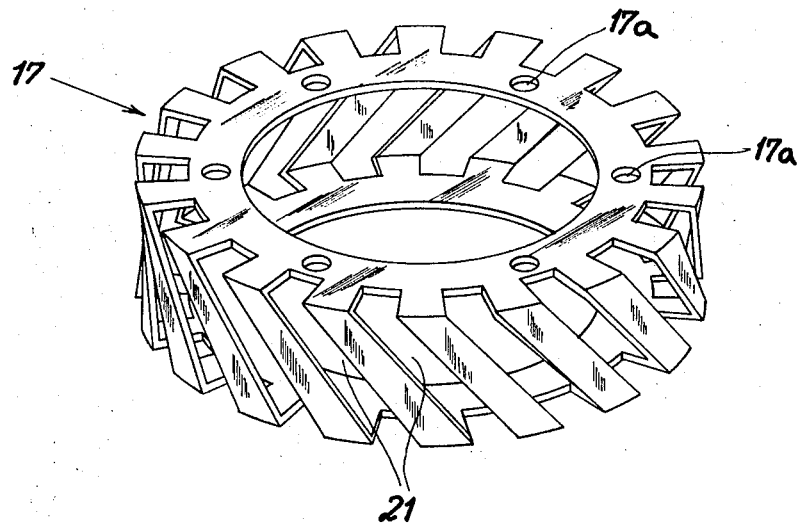
FIG. 2 is a perspective view of one embodiment of the expandable member according to my invention.

FIG. 2 shows in greater detail how the member 17 is constructed. It consists of a doughnut-shaped piece of sheet metal whose sides have been cut out at 21 to allow it to expand. The strips of metal remaining between the slots 21 tend to lengthen the member 17 under torque in one direction and shorten it under torque in the opposing direction. Holes 17a are intended to receive the pins 13b.

Figure 3:
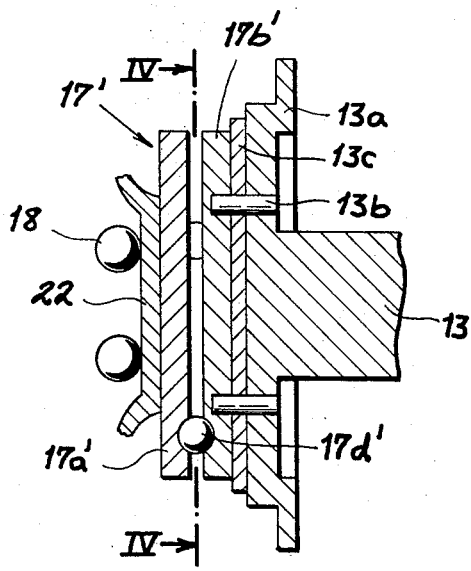
FIG. 3 is a detail of FIG. 1 showing a second embodiment of the expandable member.
Figure 4:
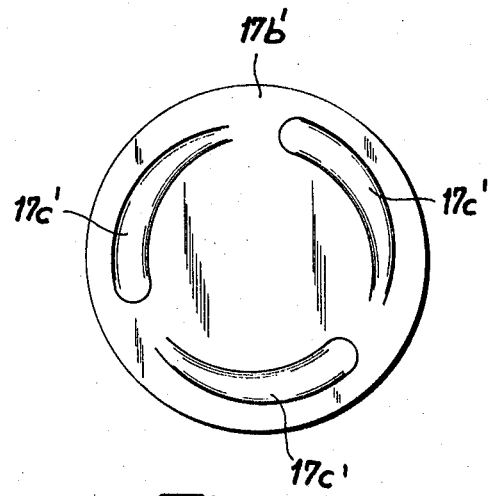
FIG 4 is a view along line IV-IV of FIG 3.

FIGS. 3 and 4 show an alternative embodiment of the member 17. Here a member 17' is comprised of two plates 17a' and 17b' whose facing surfaces are formed with ramps 17c' in which balls 17d' ride. Mutual rotation of these two members 17a' and 17b' tends to spread them.

My accelerometer operates as follows:

On starting of the motor vehicle, the shaft 13 rotates and, through the member 17 and the membrane 22 entrains the mass 12 into rotation until, once the vehicle has reached a constant speed, the mass 12 rotates along with the shaft 13 at the same speed.

On slowing or stopping the shaft 13 rotates more slowly. Since the mass 12 is rotating in the bearings 14 and 15 at its original angular velocity, its inertia tends to keep it rotating at substantially the same speed and it therefore exerts a torque on the member 17 through the membrane 22. This torque is proportional to the difference in angular velocities between the mass 12 and the wheel 23 and causes the member 17 to expand and press against the sleeve 19 thereby compressing the strain-gauge elements 20 and changing their resistance and thereby adjusting the valve 27 and the braking pressure, if necessary.

Although I have shown my valve in relation to a system for regulating the brake pressure in a motor vehicle, it goes without saying that the advantages of my accelerometer can be used wherever an accelerometer for measuring angular acceleration is needed.

The improvement described and illustrated is believed to admit of many modifications within the ability of persons skilled in the art, all such modifications being considered within the spirit and scope of the invention except as limited by the appended claims.

I claim:
1. An accelerometer for metering angular acceleration of a rotatable body, said accelerometer comprising:
a rotatable member of an axial length variable under torque applied across two sides of said member;
first means for operatively connecting one of said sides to said rotatable body;
a rotatable mass;
second means for operatively connecting said mass to the other of said sides for joint rotation of said mass and said member, one of said first and second means affording limited relative angular displacement between said mass and said body whereby a difference in angular velocities between said mass and said body generates torque in said member for altering said axial length; and
sensing means engageably by said other of said sides for detecting a change in said axial length and generating an output representing said angular acceleration of said rotatable body, said sensing means being a pressure-responsive strain gauge and said output representing said angular acceleration of said rotatable body being a change in electrical resistance of said strain gauge.

2. The accelerometer defined in claim 1 wherein said member and said mass are rotatable about a common axis.

3. The accelerometer defined in claim 2 wherein said second means affords limited relative angular displacement between said mass and said member.

4. The accelerometer defined in claim 3 wherein said second means is a deformable membrane.

5. The accelerometer defined in claim 2 further comprising a housing receiving said member and said mass and mounting said sensing means, and a bearing mounted between said housing and said rotatable mass.

6. The accelerometer defined in claim 5 wherein said mass is substantially cylindrical and is formed with an axial throughgoing bore receiving said member.

7. The accelerometer defined in claim 5 wherein said first means for connecting said one of said sides to said rotatable includes a rotatable shaft member partially received in said housing, said accelerometer further comprising a second bearing between said shaft member and said mass, said bearings permitting rotation of said mass about said common axis hindering displacement of said mass along said common axis.

8. The accelerometer defined in claim 7 wherein said bearings are combined axial-radial thrust bearings.

9. The accelerometer defined in claim 2 wherein said member comprises two juxtaposed plates and camming means for axially spreading said plates on relative angular displacement thereof.

10. The accelerometer defined in claim 9 wherein said camming means comprises at least one ball and said plates are substantially circular and lie at a substantially right angle to said common axis, said plates being formed on their facing surfaces with matching arcuate ramps receiving said ball, whereby relative rotation of said plates about said common axis drives said ball up said ramps, thereby spreading said plates.

11. An accelerometer for metering angular acceleration of a rotatable body, said accelerometer comprising:
a rotatable member of an axial length variable under torque applied across two sides of said member;
first means for operatively connecting one of said sides to said rotatable body;
a rotatable mass;
second means for operatively connecting said mass to the other of said sides for joint rotation of said mass and said member, one of said first and second means affording limited relative angular displacement between said mass and said body whereby a difference in angular velocities between said mass and said body generates torque in said member for altering said axial length; and
sensing means engageable by said other of said sides for detecting a change in said axial length and generating an output representing said angular acceleration of said rotatable body, said member being generally formed as a hollow cylinder, the peripheral wall of said cylinder being formed with a multiplicity of metal strips extending substantially helically with respect to the axis of said cylinder.

12. The accelerometer defined in claim 11 wherein said strips lie generally at a 45° angle to the axis of said cylinder.